Oct. 2, 1945. O. C. IRWIN Re. 22,677

REFRIGERATING SYSTEM

Original Filed Sept. 12, 1932 2 Sheets-Sheet 1

INVENTOR
Oliver C. Irwin
BY Theodore Simmons
his ATTORNEY

Oct. 2, 1945. O. C. IRWIN Re. 22,677
REFRIGERATING SYSTEM
Original Filed Sept. 12, 1932 2 Sheets-Sheet 2
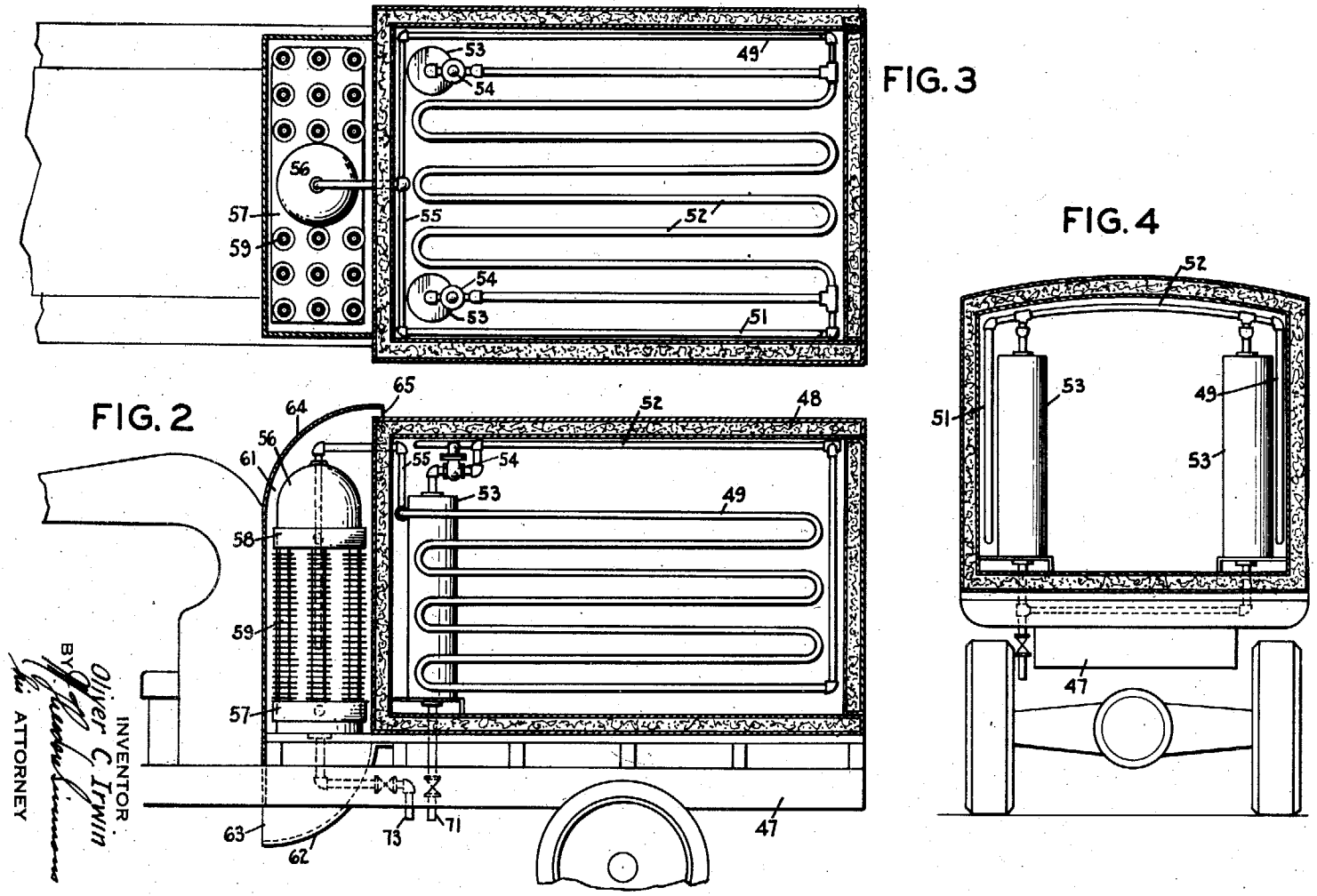
INVENTOR
Oliver C. Irwin
BY Theodore Simmons
his ATTORNEY Reissued Oct. 2, 1945

Re. 22,677

UNITED STATES PATENT OFFICE 22,677

REFRIGERATING SYSTEM

Oliver C. Irwin, deceased, late of New York, N. Y., by Standard Cap & Seal Corporation, assignee, New York, N. Y., a corporation of Virginia Original No. 2,316,792, dated April 20, 1943, Serial No. 632,741, September 12, 1932. Application for reissue April 19, 1944, Serial No. 531,847

10 Claims. (Cl. 62—93)

His invention relates to refrigeration systems and more particularly to a system of mobile refrigeration.

Insofar as this application is concerned, his invention will be described in connection with refrigerated automobile trucks and trailers but it will be apparent that certain phases of the invention will be applicable to refrigerated railway cars and other forms of mobile transportation.

Various attempts have been made to cool trucks by systems of refrigeration other than the old ice and salt method but none of these systems have been practical, either because of the complexity of apparatus used, or the space requirements, or, as in all of the systems, including the ice and salt method, the disadvantage of great additional weight required to be carried by the truck.

It is one object of his invention to provide a system of refrigeration for mobile units wherein there are no moving parts on the truck and wherein the weight of apparatus and refrigerant required as well as the space occupied thereby are negligible factors on a truck or trailer.

His invention insofar as the foregoing is concerned, consists of at least two phases, namely, the particular arrangement of the refrigeration system and cycle, and specific improvements in the apparatus used.

The refrigeration system made use of is basically an absorption system with certain modifications. One of these modifications consists in dividing the absorption system into two parts, one of which is located on the mobile unit and the other of which is located at some point that might be referred to as a central depot or recharging station. There are certain modifications that he has introduced into the system and apparatus by reason of this division of functions of an absorption refrigeration cycle.

It is another object of his invention to provide a system of refrigerated mobile transportation wherein a loaded truck or trailer may be transported over long distances being periodically recharged with cooling agents at intermediate points along its journey, at which intermediate points would be located regenerating stations for the refrigerant and cooling agents.

It is still another object of his invention to provide a system of cooling mobile refrigeration units in which the mobile unit is charged with pre-cooled cooling agents.

It is a further object of his invention to provide a system of refrigeration using the absorption cycle wherein a compressor is used to precool the condensed refrigerant.

Other and further objects of his invention will be apparent from the following description taken in conjunction with the accompanying drawings wherein—

Figs. 2, 3 and 4 are respectively vertical sections, plan and end views of a portion of an automobile truck equipped with apparatus of his invention and including mechanism for completing the refrigeration system;

Figures 1, 5, 6:
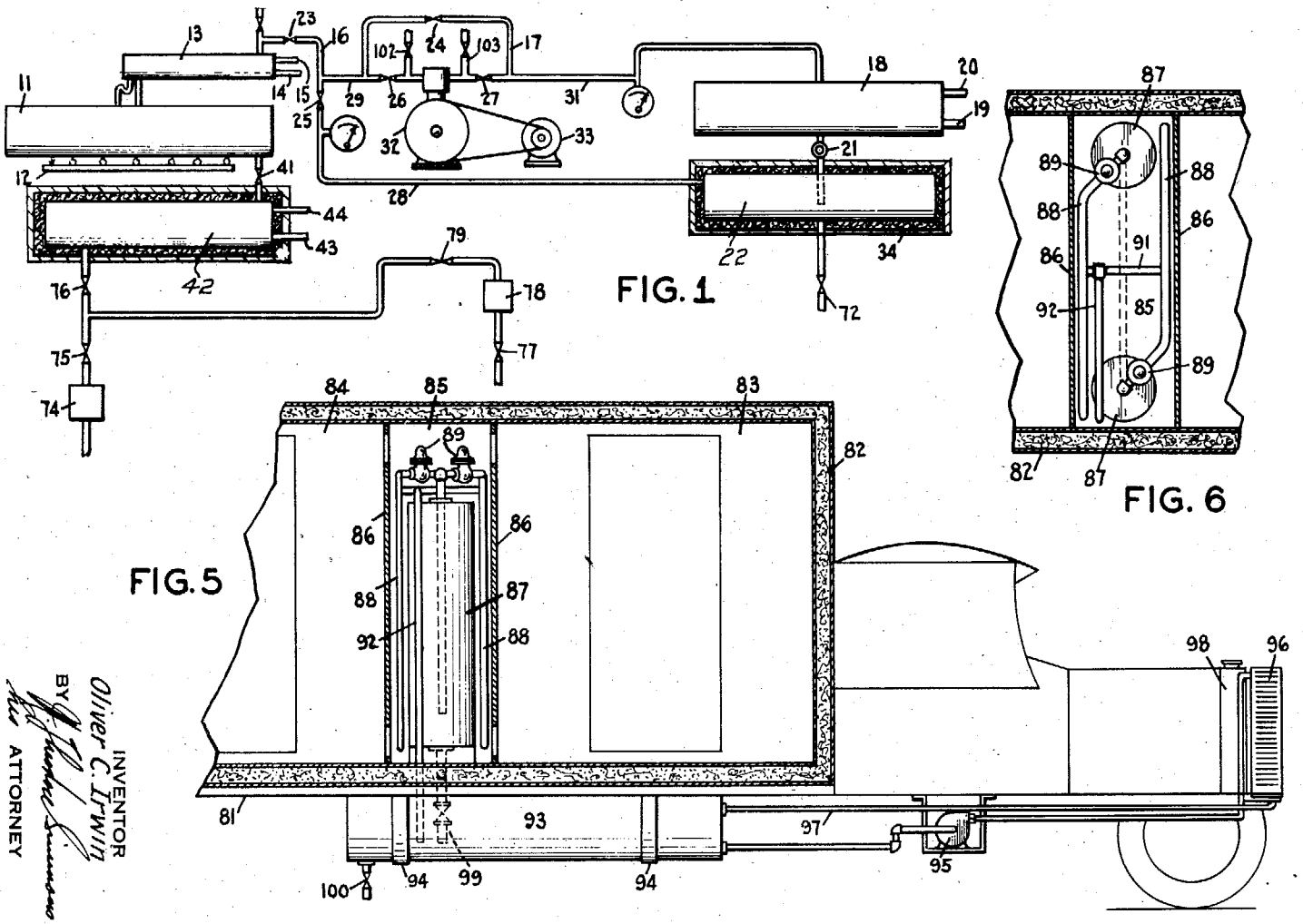
Figure 1 is a diagrammatic illustration of so much of his improved refrigeration system as is located at a central depot or reclamation point.
Fig. 5 is a partial view of a truck with a modified arrangement and location of apparatus.
Fig. 6 is a partial plan view of a portion of the apparatus of Fig. 5.

He will first describe the reclamation or regenerating station which may be a central depot. At the outset it should be pointed out that the reclamation station that is hereinafter described is intended to handle the charge from one truck or a few trucks at a time. A large central depot for handling the charges for a large number of trucks would have a larger assortment of apparatus to perform the special functions hereinafter described. One such system is outlined in his copending application Ser. No. 632,740, filed Sept. 12, 1932. The refrigerant will be assumed to be ammonia and the absorbing liquor water, although as is known in this art other combinations may be used.

A generator or still 11 having a heater 12 is adapted to receive a strong liquor (water in which the ammonia charge has been absorbed) from the truck in a manner to be hereinafter described. In the boiling that takes place in the generator the ammonia is vaporized and passes from the still into a dehydrator 13, the purpose of which is to condense out of the ammonia vapor any water vapor which may have escaped with the ammonia vapor. For this purpose the dehydrator is water cooled, the inlet and outlet pipes of the water cooling system being indicated at 14 and 15 respectively. Ammonia vapor then passes from the dehydrator 13 through the pipes 16 and 17 to the condenser 18. The condenser 18 may be of the usual tubular type and is also water cooled, the inlet and outlet pipes for the water circulatory system being indicated respectively at 19 and 20. Here the ammonia vapors are condensed and become liquid or anhydrous ammonia, which passes from the condenser into the storage chamber 22 through the expansion valve 21. This ammonia is now ready to be introduced into the truck, insofar as the normal refrigeration cycle is concerned.

However, for reasons that will be explained hereinafter, he prefers to pre-cool the refrigerant, that is to cool the same before it is introduced into the truck. For this purpose and after the regeneration or reclamation of the refrigerant is completed, the valves 23 and 24 are closed and the valves 25, 26 and 27 opened. Valve 24 shuts off communication between the condenser 18 and the dehydrator 13. Valve 25 is located in the pipe 28 leading from the storage tank 22 and opens this line while the valve 23 prevents communication of this line with the dehydrator 13. Valves 26 and 27 open the branch lines 29 and 31 respectively to and from a compressor 32 that is driven by the motor 33. Ammonia gas and vapor is drawn off the tank 22 by the compressor through the lines 28 and 29, compressed and discharged through the line 31 back into the condenser 18 where the same is recondensed and returned to the storage tank 22. This operation is continued progressively reducing the temperature of the ammonia to whatever degree is desired, even as low as —50° F. When the desired cooling is completed, valve 25 is closed, the compressor is stopped, and the refrigerant is now in the condition that he wishes it to be when inserted into the truck. The storage tank 22 is completely enclosed with a layer of heat insulation 34.

The liquor remaining in the generator 11 after the refrigerant has been boiled off is weak liquor, that is liquor from which the refrigerant has been removed. He desires to also pre-cool that liquor. For this purpose the valve 41 will be opened and the weak liquor drawn from the generator 11 into the cooling tank 42. This tank is water cooled, the inlet and outlet pipes of the water circulatory system being respectively indicated at 43 and 44. The cooled weak liquor remains in the tank 42 until ready to be placed upon the truck.

A simple absorption refrigeration cycle is normally the distilling off of the refrigerant vapor, the condensing thereof to produce the liquid refrigerant, the passing of the liquid refrigerant through the evaporator, which is located in the unit to be cooled and by means of which the heat in that unit is absorbed thereby vaporizing the refrigerant, the absorption of the spent refrigerant in the weak liquor, and the return of the now strong liquor to the generator where the cycle is again repeated. From the foregoing description it will be seen that there has only been set forth the reclamation and condensing of the refrigerant plus the pre-cooling of the refrigerant and the weak liquor. The remainder of the complete cycle is carried out on the mobile unit.

Referring to Figs. 2 and 4, there is shown one of a large number of arrangements of apparatus upon the truck that is possible with his improved system.

A truck chassis is indicated at 47 as supporting an insulated truck body 48, inside of which are a pair of sidewall cooling coils 49 and 51 and a roof cooling coil 52. Any one or all of these may be used as needed in the particular service to which a truck is to be put. Also on the interior of the body 48 are a pair of tanks 53, each of which has an expansion valve 54 connected thereto. The cooling coils 49 and 51 may be interconnected and both valves 54 and tanks 53 connected to the system of cooling coils at any desired point, or one tank 53 with associated valve 54 may be connected to one set of the cooling coils and the other tank 53 with its associated valve 54 may be connected to the other cooling coil. The tanks 53 are adapted to be filled with a pre-cooled refrigerant.

In the system shown in Figs. 2, 3 and 4, the cooling coils are interconnected and terminate in a common return line 55 which extends into the interior of an absorber tank 56 located outside of the insulated body 48. The absorber 56 is filled at the reclamation station with weak liquor as will be hereinafter described. The refrigerant is vaporized in the cooling coils that are inside the truck body, the spent gases passing therefrom into the absorber 56, where they are absorbed in the liquor contained therein.

The absorber tank 56 includes a pair of headers 57, 58, in between which are disposed a plurality of finned pipes 59. The hot spent gases are discharged near the bottom of the tank 56, pass out into the cooling coils 59 and upwardly therein, being cooled in the passage therethrough, and are discharged back into the tank 56 near the top thereof.

The air cooling of the absorber and the associated coils is accomplished by locating this apparatus in a separate compartment 61 located in back of the driver's cab and ahead of the truck body 48. This compartment is provided at its bottom with an air scoop 62 open at its front as indicated at 63, and an air funnel 64 open at its rear as indicated at 65 and terminating just above the top of the truck body 48. As the truck proceeds forwardly air is forced to enter the compartment 61 at the bottom, pass through the compartment over the tank 56 and the cooling tubes 59 and be passed from the compartment through the funnel 64 in a dense large volume of air.

When the truck is ready to start its run, the tanks 53 are filled with pre-cooled refrigerant from the tank 22, a flexible hose connection (not shown) being attached to the valve connection 71 leading from the tanks 53 on the truck, and the valved connection 73 leading from the storage tank 22 at the reclamation depot. The hose may be permanently attached at 73 and be attached to the truck by any of the well known leak proof couplings. There may also be interposed in this line a pump if necessary for the transfer of the refrigerant from the tank 22 to the tanks 53.

At this point it is desirable to direct attention to the advantage of the use of the pre-cooled refrigerant. Succinctly, that advantage may be stated to be that the refrigerant on the truck occupies a very much less space if pre-cooled and yet does the same amount of useful work on the truck.

This is true because if it be assumed that ammonia that is not pre-cooled is at 75° F., and the unit to be cooled is to be maintained at a temperature of —10° F., then the ammonia itself must first be cooled to —10° F. before beginning its useful work. This cooling of the ammonia is accomplished by boiling off enough of the ammonia itself so as to take up enough heat to cool the remainder to the —10° point. Thereafter, the remainder will continue cooling but will begin taking heat out of the body to be cooled. Accordingly, if it be assumed that it takes a given tank of ammonia to maintain an object at —10° F. over a predetermined period of time and one quarter of that tank is required to first bring the ammonia down to that −10° temperature before useful work is started of cooling the object, then it is at once apparent that if the ammonia is cooled to the −10° point or below before it is put into the truck, only that much need be put in the truck as is required to do the useful work. Or, in the assumed example, one quarter less space will be occupied by the refrigerant and one quarter less weight will have to be carried by the truck in order to accomplish the desired result.

To complete the charging of the truck a flexible hose connection (not shown) is also made between the valved connection 73 on the tank 56 of the truck and the pump 74 at the reclamation depot. When the truck is to be filled, the valves 75 and 76 are opened and the pre-cooled weak liquor in the tank 42 is transferred from that tank to the tank 56. The valved connections 71 and 73 are closed and the hose connections are detached. The truck is now ready to begin its run which may be continued to the next reclamation depot (if the run is a long one), or to the point of delivery where there may also be a reclamation depot.

At one or the other of these points the truck is emptied of cooling agents and the refrigerant is regenerated and pre-cooled ready to recharge the truck or to fill the next truck. This emptying of the truck is accomplished by re-establishing the hose connection between the valved connections 71 and 73 withdrawing the unused refrigerant if any from the cooling coils and the tanks in the body of the truck, this refrigerant being put in the storage tank 22. Also a detachable hose connection is made between the valved connection 73 for the absorber tanks 56 and the valved connection 77 for the pump 78. When this connection is made, the valves 77 and 79 are opened after the valve 75 is closed. The liquor is then drawn out of the tank 56 and deposited in the tank 42 or passed directly into the still 11 by opening the valve 41. When the tank 56 and associated coils are emptied the hose connection is detached and the valve 76 is closed. After the liquor is in the generator 11, the valve 41 is closed. During this transfer the tank 42 is not cooled. When the liquor is withdrawn from the tank 56, it is no longer weak liquor but a strong liquor, that is it has a charge of spent ammonia therein.

This completes a description of one cycle of operation of his improved system and apparatus.

Figs. 5 and 6 illustrate a modified arrangement of apparatus. In this showing the chassis 81 supports an insulated truck body 82 having a pair of compartments 83, 84, separated by a smaller central compartment 85 divided from the other two compartments by ventilated partitions 86. Located in the central compartment 85 are a pair of tanks 87 to each of which is attached a cooling coil 88 extending parallel to the partitions 86 on the respective sides of the compartment. Interposed between the respective tanks 87 and coils 88 are valves 89. All of these parts find counterparts in the equipment on the interior of the truck of Figs. 2, 3 and 4 and perform corresponding functions.

The coils 88 communicate with a common return line 91, the branch 92 of which extends through the bottom of the truck into the absorber tank 93 located beneath the body of the truck and supported on the cassis by means of the straps 94. The absorber tank 93 contains a supply of weak liquor which absorbs the ammonia gas spent in the cooling of the body of the truck as described above.

In order to dissipate the heat of the absorption of the spent gas in the weak liquor he provided a circulatory water system. A fluid pump 95 is intended to be driven either from the drive shaft of the engine or by a separate motor driven from the truck battery. The pump draws the liquid from the tank 93 and circulates the same through a radiator 96, the cooled liquor returning through the branch 97 to the tank 93. It will be noted that the cooling radiator 96 is placed in front of the truck ahead of the normal engine radiator 98 of the truck so that the fan of the truck cooling system also draws air through the radiator 96 to facilitate the cooling of the strong liquor. This cooling radiator could be disposed along the side of the truck body, if desired. The tanks 87 are filled and emptied through the valve connection 99, and the weak liquor or absorber tank 93 is drained and filled through the valved connection 100.

Otherwise, the equipment on the truck of Figs. 5 and 6 is filled, emptied and functions exactly as described above in connection with the truck shown in Figs. 2 to 4 inclusive.

At times it may be desirable to use the compressor 32 to exhaust the absorber and cooling coils of the truck prior to charging the same. To this end the compressor is provided with a pair of valved connections 102, 103 respectively, located on the suction and exhaust sides of the compressor.

Modifications may be made in the arrangement and location of parts within the spirit and scope of his invention, and such modifications are intended to be covered by the appended claims.

What is claimed is:

1. A refrigerated truck comprising a chassis having a driver's cab and an insulated body carried by the chassis, an evaporator carried by the body, cooling coils connected to the evaporator and disposed on the interior of the body, an absorber of an absorption refrigeration system mounted outside of the body and connected to the cooling coils, means whereby the evaporator and absorber may be periodically re-supplied with fresh refrigerant and absorbent respectively, and a chimney surrounding said absorber to direct air thereover.

2. A refrigerated mobile unit including an insulated body, a plurality of refrigerant holders carried by the body each having an expansion valve and a cooling coil connected thereto, said coils being disposed on the interior of the body, an absorber of an absorption refrigeration system mounted outside of the body and connected to the cooling coils and comprising a tank having extensive cooling surfaces, and means whereby the holder and absorber may be periodically re-supplied with fresh refrigerant and absorbent respectively.

3. A refrigerated mobile unit including an insulated body, an evaporator carried by the body including cooling coils disposed on the interior of the body, an absorber mounted outside of said body and connected to and directly receiving gases from the cooling coils and comprising a tank having extensive finned cooling surfaces, and valve means extending from the bottom of the tank and the evaporator to a point easily accessible exteriorly of the mobile unit whereby the evaporator and absorber may be periodically re-supplied with fresh refrigerant and absorbent respectively.

4. A refrigerated mobile unit including an insulated body, an evaporator carried by the body including cooling coils disposed on the interior of the body, an absorber of an absorption refrigeration system mounted outside of the body and connected to and directly receiving gases from the cooling coils and comprising a cooling radiator mounted so as to receive a large volume of air thereover due to the forward motion of the unit, and valve means extending from the bottom of the absorber and the evaporator to a point easily accessible exteriorly of the mobile unit whereby the evaporator and absorber may be periodically re-supplied with fresh refrigerant and absorbent respectively.

5. A refrigerated mobile unit including an insulated body, an evaporator carried by the body including cooling coils disposed on the interior of the body, a fan, an absorber mounted outside of the body and connected to the cooling coils and comprising a cooling radiator mounted at the forward end of the unit, so that air is drawn over the radiator by the fan.

6. A refrigerated mobile unit including an insulated body, refrigerant holding means carried by said body, cooling coils within said body connected to said refrigerant holding means, said refrigerant holding means and coils being disposed on the interior of the body so as to divide the same into two refrigerated storage compartments, and an absorber mounted outside of the body and connected to the cooling coils and comprising a tank having extensive cooling surfaces.

7. A refrigerated truck comprising a chassis having a driver's cab and an insulated body carried by the chassis, an evaporator carried by the body comprising cooling coils disposed on the interior of the body, an absorber of an absorption refrigeration system mounted outside of the body and connected to the cooling coils and comprising a tank having extensive cooling surfaces, said absorber being mounted between the truck body and the driver's cab, and means whereby the evaporator and absorber may be periodically re-supplied with fresh refrigerant and absorbent respectively.

8. A refrigerated truck comprising a chassis having a driver's cab and an insulated body carried by the chassis, refrigerant holding means carried by the body, cooling coils connected to said refrigerant holding means and disposed on the interior of the body, an absorber of an absorption refrigeration system mounted outside of the body and connected to the cooling coils, means whereby the refrigerant holding means and absorber may be periodically re-supplied with fresh refrigerant and absorbent respectively, means open to the normal direction of travel of the truck whereby air is caught and directed over said absorber, and additional means for directing the air away from the absorber.

9. A refrigerated mobile unit comprising a body, an evaporator carried by said unit and including cooling coils disposed within said body, an absorber connected to said coils to receive refrigerant vapor directly therefrom and mounted exteriorly of said body in such position that air passes freely thereover upon movement of the unit, and means whereby the evaporator and absorber may be periodically supplied with fresh refrigerant and absorbent respectively.

10. A refrigerated mobile unit comprising a body, a refrigerant holding tank carried by said unit, cooling coils within said body connected to said refrigerant holding tank, an absorbent holding tank connected to said coils to receive refrigerant vapor directly therefrom and mounted exteriorly of said body in such position that air passes freely thereover upon movement of the unit, and means whereby the refrigerant holding tank and the absorbent holding tank may be periodically supplied with fresh refrigerant and absorbent respectively.

STANDARD CAP & SEAL CORPORATION,
By RUSSELL McGEE,
*President,*
*Assignee of Oliver C. Irwin, Deceased.*